United States Patent
Song et al.

(10) Patent No.: US 12,272,879 B2
(45) Date of Patent: Apr. 8, 2025

(54) METHOD AND APPARATUS FOR ESTIMATING CHANNEL IN COMMUNICATION SYSTEM

(71) Applicant: Electronics and Telecommunications Research Institute, Daejeon (KR)

(72) Inventors: Young Seog Song, Daejeon (KR); Eun Young Choi, Daejeon (KR); Song Noh, Incheon (KR); Kyung Sik Seo, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 331 days.

(21) Appl. No.: 18/086,276

(22) Filed: Dec. 21, 2022

(65) Prior Publication Data

US 2023/0208025 A1    Jun. 29, 2023

(30) Foreign Application Priority Data

Dec. 27, 2021  (KR) .................. 10-2021-0188969

(51) Int. Cl.
*H01Q 3/16* (2006.01)
*H04B 7/06* (2006.01)

(52) U.S. Cl.
CPC ............. *H01Q 3/16* (2013.01); *H04B 7/0617* (2013.01); *H04B 7/0634* (2013.01)

(58) Field of Classification Search
CPC ....... H01Q 3/16; H04B 7/0617; H04B 7/0634
See application file for complete search history.

(56) References Cited

U.S. PATENT DOCUMENTS

| | | | |
|---|---|---|---|
| 8,412,139 | B2 | 4/2013 | Park et al. |
| 9,762,301 | B2 | 9/2017 | Kim et al. |
| 9,800,384 | B2 | 10/2017 | Molev Shteiman et al. |
| 2015/0103934 | A1 | 4/2015 | Nam et al. |
| 2021/0075474 | A1 | 3/2021 | Raghavan et al. |
| 2021/0126359 | A1 | 4/2021 | Kim et al. |
| 2021/0288698 | A1 | 9/2021 | Chen et al. |

FOREIGN PATENT DOCUMENTS

WO    2021/207748    10/2021

*Primary Examiner* — Curtis B Odom
(74) *Attorney, Agent, or Firm* — KILE PARK REED & HOUTTEMAN PLLC (57) ABSTRACT

A method of estimating a channel of a base station in a communication system using an IRS may comprise: receiving a first signal through a direct path between a terminal and the base station from the terminal and a second signal through an indirect path through the IRS from the terminal; estimating a first angle of arrival of the second signal received from the IRS; estimating a second angle of arrival of a signal transmitted to the IRS by the terminal based on the estimated first angle of arrival; estimating a third angle of arrival of the first signal received from the terminal based on the estimated first angle of arrival; and estimating path gains on the direct path and the indirect path based on the estimated first angle of arrival to the estimated third angle of arrival.

19 Claims, 4 Drawing Sheets

METHOD AND APPARATUS FOR ESTIMATING CHANNEL IN COMMUNICATION SYSTEM

CROSS-REFERENCE TO RELATED APPLICATIONS

This application claims priority to Korean Patent Application No. 10-2021-0188969, filed on Dec. 27, 2021 with the Korean Intellectual Property Office (KIPO), the entire contents of which are hereby incorporated by reference.

BACKGROUND

1. Technical Field

Example embodiments of the present disclosure relate to an intelligent reflecting surface technology in a communication system, and more particularly, to a technology for estimating a channel in a communication system using an intelligent reflecting surface.

2. Related Art

A communication system using an intelligent reflecting surface (IRS) may include low-cost passive elements which reflect an incident signal and may control a reflection pattern of the passive elements to form an advantageous propagation channel. Even when a direct path between a base station and a terminal is blocked, a communication system using an intelligent reflecting surface can generate an additional indirect path, which can compensate for disadvantages of millimeter wave band communication, such as high straightness and large path loss.

However, in order to realize potential advantages of a communication system using an intelligent reflecting surface, a base station needs to acquire accurate channel state information of a direct path between the base station and a terminal and an indirect path between the base station, the intelligent reflecting surface, and the terminal. However, due to a non-linear relationship between millimeter wave channel parameters composed of a reflection pattern of an intelligent reflecting surface, an angle of departure of a received signal, an angle of arrival, and a path gain, it may be difficult for a base station to estimate accurate channel state information.

As a method of estimating a channel, there may be a method in which a base station may completely turn elements of an intelligent reflecting surface off to estimate a direct channel between the base station and a terminal and then may turn the intelligent reflecting surface on to subtract an influence of a direct channel from a received signal using direct channel information estimated first and then estimate an indirect channel. However, there may be a problem in that an error of the first estimated direct channel information affects the performance of subsequent indirect channel estimation.

According to another method of estimating a channel, that is, a method in which a base station estimates a direct path channel and an indirect path channel together, it is possible to solve a problem in which estimation affects mutual performance, but there may be a problem in that channel state information between the base station and an intelligent reflecting surface should be known in advance.

SUMMARY

Accordingly, example embodiments of the present disclosure are provided to substantially obviate one or more problems due to limitations and disadvantages of the related art.

Example embodiments of the present disclosure provide a method and an apparatus for reducing computational complexity of complex channel estimation and improving performance in an intelligent reflecting surface-based communication system.

According to a first exemplary embodiment of the present disclosure, a method of estimating a channel of a base station in a communication system using an intelligent reflecting surface may comprise: receiving a first signal through a direct path between a terminal and the base station from the terminal and a second signal through an indirect path through the intelligent reflecting surface from the terminal; estimating a first angle of arrival of the second signal received from the intelligent reflecting surface; estimating a second angle of arrival of a signal transmitted to the intelligent reflecting surface by the terminal based on the estimated first angle of arrival; estimating a third angle of arrival of the first signal received from the terminal based on the estimated first angle of arrival; and estimating path gains on the direct path and the indirect path based on the estimated first angle of arrival to the estimated third angle of arrival.

The receiving of the first signal through the direct path between the terminal and the base station from the terminal and the second signal through the indirect path through the intelligent reflecting surface from the terminal may further include, when a third signal in which the first signal and the second signal are added is received from the terminal, separating the first signal and the second signal from the third signal.

The first angle of arrival may be estimated based on a first algorithm; and the first algorithm may include at least one of a root-multiple signal classification (root-MUSIC) algorithm and a semi-definite programming algorithm.

The second angle of arrival may be estimated by iteratively applying an array response vector in which all elements are 1 and a maximum likelihood estimation method in a time domain.

The third angle of arrival may be estimated by iteratively applying a maximum likelihood estimation method.

The path gain on the direct path and the path gain on the indirect path may be estimated based on a linear estimation method using the estimated first angle of arrival to the estimated third angle of arrival.

An on-off reflection pattern of the intelligent reflecting surface may be varied according to a type of an antenna array included in the base station.

The on-off reflection pattern may be determined based on the number of reflection repetitions.

When the base station includes a planar array antenna, the on-off reflection pattern may include a reflection element shared when the number of reflection repetitions in a horizontal direction and the number of reflection repetitions in a vertical direction are each maximum.

The intelligent reflecting surface may include a plurality of dynamically adjustable reflectors; and a communication channel between the intelligent reflecting surface and the base station may be a channel in which one line-of-sight propagation path is present.

According to a second exemplary embodiment of the present disclosure, a base station in a communication system using an intelligent reflecting surface may comprise: a processor; a memory configured to electronically communicate with the processor; and instructions stored in the memory, wherein, when the instructions are executed by the processor, the instructions operate to cause the base station to: receive a first signal through a direct path between a terminal and the base station from the terminal and a second signal through an indirect path through the intelligent reflecting surface from the terminal; estimate a first angle of arrival of the second signal received from the intelligent reflecting surface; estimate a second angle of arrival of a signal transmitted to the intelligent reflecting surface by the terminal based on the estimated first angle of arrival; estimate a third angle of arrival of the first signal received from the terminal based on the estimated first angle of arrival; and estimate path gains on the direct path and the indirect path based on the estimated first angle of arrival to the estimated third angle of arrival.

When the first signal through the direct path between the terminal and the base station and the second signal through the indirect path through the intelligent reflecting surface are received from the terminal, the instructions may operate to cause the base station to, when a third signal in which the first signal and the second signal are added is received from the terminal, separate the first signal and the third signal from the third signal.

The instructions may operate to cause the base station to estimate the first angle of arrival based on a first algorithm; and the first algorithm may include at least one of a root-multiple signal classification algorithm and a semidefinite programming algorithm.

The instructions may operate to cause the base station to estimate the second angle of arrival by iteratively applying an array response vector in which all elements are 1 and a maximum likelihood estimation method in a time domain.

The instructions may operate to cause the base station to estimate the third angle of arrival by iteratively applying a maximum likelihood estimation method.

The instructions may operate to cause the base station to estimate the path gain on the direct path and the path gain on the indirect path based on a linear estimation method using the estimated first angle of arrival to the estimated third angle of arrival.

The instructions may operate to cause the base station to vary an on-off reflection pattern of the intelligent reflecting surface according to a type of an antenna array included in the base station.

The instructions may operate to cause the base station to determine the on-off reflection pattern based on the number of reflection repetitions.

When the base station includes a planar array antenna, the instructions may operate to cause the on-off reflection pattern to include a reflection element shared when the number of reflection repetitions in a horizontal direction and the number of reflection repetitions in a vertical direction are each maximum.

According to the present disclosure, in an IRS-based communication system, direct and indirect channels can be simultaneously estimated without prior knowledge of channel state information. In addition, in an IRS-based communication system, training overhead can be reduced using antenna structure information. Accordingly, the performance of a millimeter wave band communication system can be improved.

DETAILED DESCRIPTION OF THE EMBODIMENTS

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Figure 1:
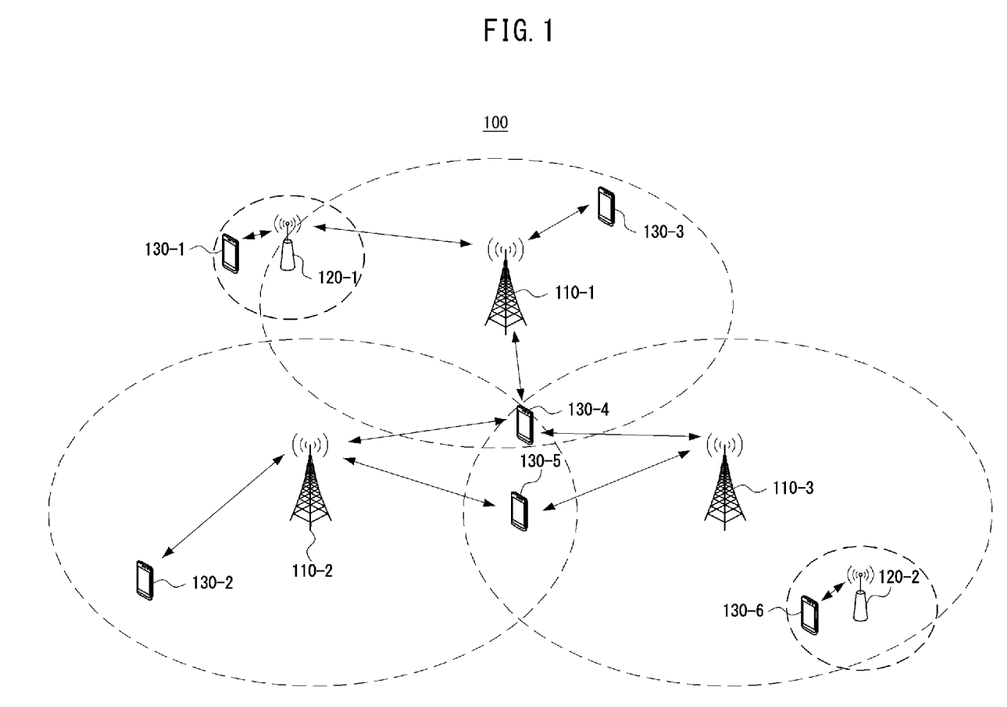
FIG. 1 is a conceptual diagram illustrating an exemplary embodiment of a communication system.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 GHz or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
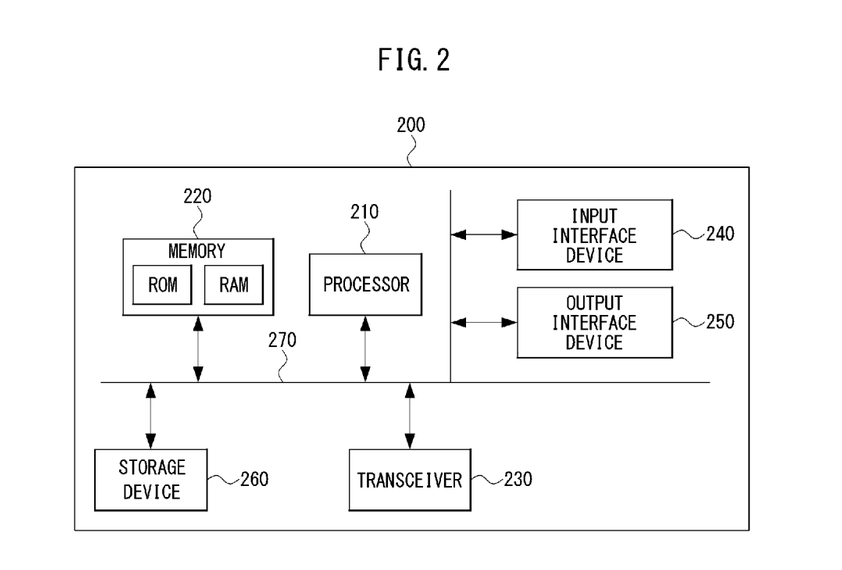
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, evolved Node-B (eNB), base transceiver station (BTS), radio base station, radio transceiver, access point, access node, road side unit (RSU), radio remote head (RRH), transmission point (TP), transmission and reception point (TRP), eNB, gNB, or the like. Here, each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of things (IoT) device, mounted apparatus (e.g., a mounted module/device/terminal or an on-board device/terminal, etc.), or the like.

Hereinafter, a communication system using an intelligent reflecting surface (IRS) will be described. When a method (e.g., signal transmission or reception) performed by a first communication node (transmission node) among communication nodes is described, a second communication node (or reception node) that corresponds to the first communication node may also perform a method (e.g., signal reception or transmission) corresponding to the method performed by the first node. That is, when an operation of a terminal is described, a base station corresponding to the terminal may perform an operation that corresponds to the operation of the terminal. On the other hand, when an operation of a base station is described, a terminal corresponding to the base station may perform an operation that corresponds to the operation of the terminal.

[IRS-Based Communication System Model]

Figure 3:
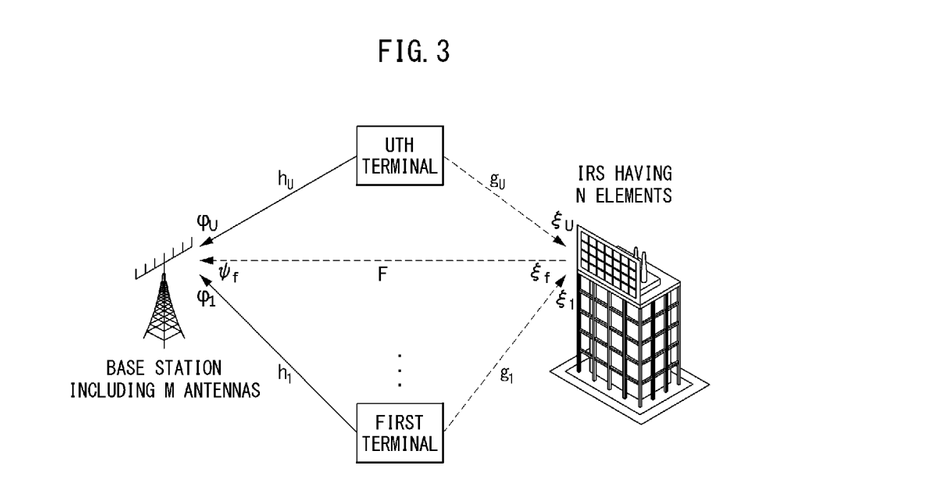
FIG. 3 is a conceptual diagram illustrating a communication system model using an IRS.

FIG. 3 is a conceptual diagram illustrating a communication system model using an IRS.

Referring to FIG. 3, a millimeter wave communication system using an IRS may include U terminals including a single antenna, a base station in which M half-wavelength interval linear array antennas are installed, and an IRS including N dynamically adjustable reflectors. In uplink communication in which each terminal transmits a signal to the base station, the terminal may continuously transmit a training pilot symbol and a data symbol to the base station at a predetermined time interval. A training period may be divided into a total of U time intervals, and each time interval may include K pilot symbols. Therefore, each terminal may transmit a signal to the base station at an individual time interval to avoid interference between terminals. A training symbol $y_{k,u}$ that is received k-th symbol time ($k \in \{1, \ldots, K\}$) by the base station from a u-th terminal ($u \in \{1, \ldots, U\}$) may be calculated as in Equation 1 below.

$$y_{k,u} = (h_u + F \, \text{diag}(w_k) g_u) x_{k,u} + n_{k,u} \quad \text{[Equation 1]}$$

In Equation 1, $h_u \in \mathbb{C}^M$ may denote a channel between the base station and the terminal, $g_u \in \mathbb{C}^N$ may denote a channel between the IRS and the terminal, and $F \in \mathbb{C}^{M \times N}$ may denote a channel between the base station and the IRS. $w_k \in \mathbb{C}^N$ may denote a reflection pattern of the IRS at a k time. $n_{k,u} \sim \mathcal{CN}(0_M, \sigma^2 I_M)$ may denote additive white noise with a mean of 0 and a variance of $\sigma^2$. $x_{k,u}$ may denote a pilot signal transmitted to the base station by the u-th terminal at the k time and in the following example embodiments, for simplicity of expression, it may be assumed that $|x_{k,u}| = \sqrt{\rho}$.

Assuming that the IRS is installed at a high position on a roof of a building or the like, the channel between the base station and the IRS may be expressed as a channel in which only one line-of-sight propagation path is present. Based on a geometrical channel model, a millimeter wave band channel between the base station and the IRS can be expressed as $F = \alpha_f u_M(\psi_f) u_N^H(\xi_f)$. $\alpha_f$ may denote a channel gain, $\psi_f$ may denote an angle of arrival of a signal, and $\xi_f$ may denote an angle of departure. $u_M(\vartheta)$ may denote a steering vector of the M linear array antennas and may be calculated as in Equation 2 below.

$$u_M(\vartheta) = [1, e^{j\pi\vartheta}, \ldots, e^{j\pi\vartheta(M-1)}]^T \text{ for } \vartheta \in (-1,1) \quad \text{[Equation 2]}$$

In Equation 2, $\vartheta$ may denote a normalized angle and may satisfy a relationship of $\vartheta = \cos(\bar{\vartheta})$ with a physical angle $\bar{\vartheta} \in (0, \pi)$.

The terminal may be positioned at a relatively low altitude. Therefore, the channel between the IRS and the terminal and the channel between the base station and the terminal may be expressed as $$g_u = \sum_{\ell=1}^{L_g} \alpha_{g,\ell,u} u_N(\xi_{g,\ell,u})$$

and $$h_u = \sum_{\ell=1}^{L_h} \beta_{\ell,u} u_M(\varphi_{\ell,u}),$$

respectively. $L_g$ and $L_h$ may denote the number of paths present in each channel, $\alpha_{g,\ell,u}$ may denote a channel gain between the IRS and the u-th terminal, and $\xi_{g,\ell,u}$ may denote an angle of arrival of a signal between the IRS and the u-th terminal. $\beta_{\ell,u}$ may denote a channel gain between the base station and the u-th terminal, and $\varphi_{\ell,u}$ may denote an angle of arrival of a signal between the base station and the u-th terminal.

When the base station receives K pilot reception signal vectors from the u-th terminal, a reception signal matrix $Y_u = [y_{1,u}, \ldots, y_{K,u}] \in \mathbb{C}^{M \times K}$ may be calculated as in Equation 3 below.

[Equation 3]
$$Y_u = \sqrt{\rho} \left( h_u 1_K^T + F \text{diag}(g_u) W \right) + N_u =$$

$$\sqrt{\rho} \sum_{\ell=1}^{L_h} \beta_{\ell,u} u_M(\varphi_{\ell,u}) 1_K^T + \sqrt{\rho} u_M(\psi_f) \sum_{\ell=1}^{L_g} \alpha_{\ell,u} u_N^H(\xi_{\ell,u}) W + N_u$$

In Equation 3, $W = [w_1, \ldots, w_K]$ and $N_u = [n_{1,u}, \ldots, n_{K,u}]$ may be matrices representing a reflection pattern and a noise of the IRS, respectively. In Equation 3, a dependent path gain between the base station, the IRS, and the u-th terminal may be defined as $\alpha_{\ell,u} \triangleq \alpha_f \alpha_{g,\ell,u}$, and a dependent path angle between the base station, the IRS, and the u-th terminal may be defined as $\xi_{\ell,u} \triangleq \xi_f - \xi_{g,\ell,u}$. In a communication system in a millimeter wave environment of the present example embodiments, since it may be assumed that both a direct path between the base station and the terminal and a dependent indirect path using the IRS are sparse in an angular space, a length K of a pilot signal can be set as max ($L_g$, $L_h$) < K ≤ N.

[Proposed Method of Estimating Channel Through Two Operations]

Figure 4:
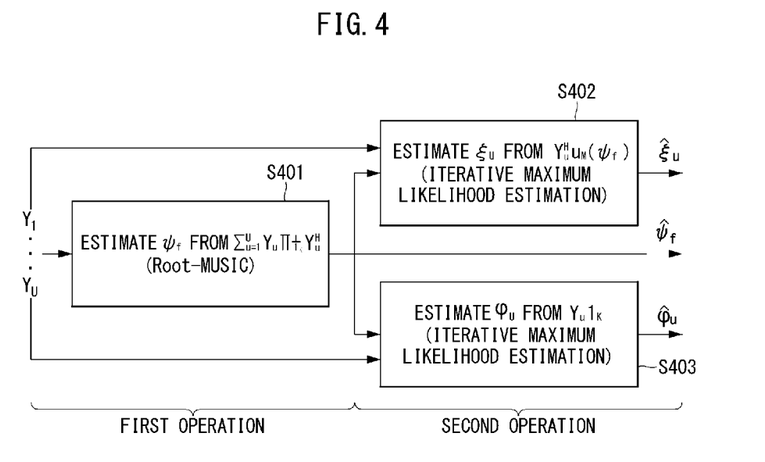
FIG. 4 is a block diagram illustrating a method of estimating a channel through two operations in a communication system using an IRS.

FIG. 4 is a block diagram illustrating a method of estimating a channel through two operations in a communication system using an IRS.

Referring to FIG. 4, in the communication system model using the above-described IRS, in order to estimate a channel according to the present example embodiments, it may be important for the base station to estimate angles $\psi_f$, $\xi_u = [\xi_{1,u}, \ldots, \xi_{L_g,u}]^T$, and $\varphi_u = [\varphi_{1,u}, \ldots, \varphi_{L_h,u}]^T$ on a path. In the method of estimating a channel, a method in which the base station estimates an angle on a path may include the first operation S401 of estimating $\psi_f$ through a root-multiple signal classification (root-MUSIC) algorithm and the second operation S402 and S403 of estimating $\xi_u$ and $\varphi_u$ based on the estimated $\psi_f$ through an iterative maximum likelihood estimation method. After the base station estimates all angles on the path, the base station may obtain path gains $\alpha_u = [\alpha_{1,u}, \ldots, \alpha_{L_g,u}]^T$ and $\beta_u = [\beta_{1,u}, \ldots, \beta_{L_h,u}]^T$ through a linear estimation method.

The base station may receive each of a signal through a direct path and a signal through an indirect path from the terminal. Alternatively, the base station may receive a signal, in which the signal through the direct path and the signal through the indirect path are added, from the terminal. Accordingly, the base station may estimate an angle and a path gain on each path by separating the signal through the direct path and the signal through the indirect path from the received signal in which the signal through the direct path and the signal through the indirect path are added. The base station may use channel sparsity of a millimeter wave band and an antenna manifold structure to estimate the angle and path gain on the path. Therefore, the base station may use an on-off reflection pattern of the IRS as in Equation 4 below.

$$W = \begin{bmatrix} I_K \\ 0_{N-K} 0_K^T \end{bmatrix} \quad \text{[Equation 4]}$$

A reception signal matrix when the base station receives K pilot reception signal vectors from the u-th terminal using the on-off reflection pattern of the IRS may be expressed as in Equation 5 below from Equation 3 above. On the other hand, in Equation 5, a noise part (that is, $N_u$) of $Y_u$ may be omitted for concise expression.

$$Y_u = \sqrt{\rho}\left(U_M(\varphi_u)\beta_u 1_K^T + u_M(\psi_f)\alpha_u^T U_N^H(\xi_u)W\right) = \quad \text{[Equation 5]}$$
$$\sqrt{\rho}\left(U_M(\varphi_u)\beta_u 1_K^T + u_M(\psi_f)\alpha_u^T U_K^H(\xi_u)\right)$$

In Equation 5, $U_P(\vartheta)$ may denote an antenna steering matrix and may be defined as $U_P(\vartheta)=[u_P(\vartheta_1), \ldots, u_P(\vartheta_Q)]$ with respect to a normalized angle set such as $\vartheta=[\vartheta_1, \ldots, \vartheta_Q]^T$. A manifold of a linear array antenna in the last line of Equation 5 may be maintained without change using the on-off reflection pattern of the IRS. A column vector space of $Y_u$ may be generated using spatial antenna steering vectors composed of $\varphi_u$ and $\psi_f$. A row vector space of $Y_u$ may be generated using a vector in which all elements are 1 and an antenna steering vector of $\xi_u$ obtained in a time domain.

[First Operation-Estimation of $\psi_f$]

Figure 5:
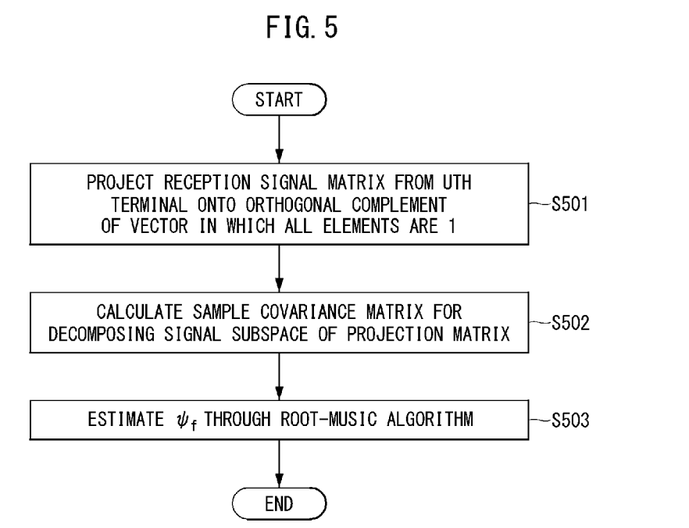
FIG. 5 is a flowchart illustrating the first operation of the method of estimating a channel.

FIG. 5 is a flowchart illustrating the first operation of the method of estimating a channel.

Referring to FIG. 5, in order to use a temporal characteristic in operation S401 of estimating $\psi_f$, the base station may suppress a channel component between the base station and the terminal. When Equation 5 is projected onto an orthogonal complement of a vector in which all elements are 1, the base station may express Equation 5 as Equation 6 below (S501).

$$Y_u \Pi_{1_K}^\perp = \sqrt{\rho}\, u_M(\psi_f)\alpha_u^T U_K^H(\xi_u)\Pi_{1_K}^\perp \quad \text{[Equation 6]}$$

In Equation 6, $$\Pi_A^\perp$$

may be a projection matrix onto an orthogonal complement of a space generated by a column vector of a matrix A and may be expressed as $$\Pi_A^\perp \triangleq I - AA^\dagger.$$

A sample covariance matrix for decomposing a signal subspace in Equation 6 may be calculated as in Equation 7 below (S502).

$$Y_u \Pi_{1_K}^\perp Y_u^H = \rho \left\| \alpha_u^T U_K^H(\xi_u)\Pi_{1_K}^\perp \right\|_2^2 u_M(\psi_f)u_M^H(\psi_f) \quad \text{[Equation 7]}$$

In the covariance matrix of Equation 7, an eigenvector of a signal component may correspond to an antenna steering vector $u_M(\psi_f)$ in $\psi_f$. Therefore, in order to estimate an angle with high resolution, the base station may estimate of using a root-MUSIC algorithm which is a subspace-based technique that has been used in the past (S503). The base station may use a semi-definite programming (SDP) algorithm as well as subspace-based algorithm (e.g., the root-MUSIC algorithm) to estimate $\psi_f$.

Since a channel parameter $\psi_f$ between the base station and IRS is common to all terminals in a multi-user scenario, signals received from the U terminals may be commonly used to estimate $\psi_f$. Therefore, the sample covariance matrix may be calculated as in Equation 8 below.

$$\sum_{u=1}^{U} Y_u \Pi_{1_K}^\perp Y_u^H = \rho \left( \sum_{u=1}^{U} \left\| \alpha_u^T U_K^H(\xi_u)\Pi_{1_K}^\perp \right\|_2^2 \right) \times u_M(\psi_f)u_M^H(\psi_f) \quad \text{[Equation 8]}$$

Since the largest eigenvalue in Equation 8 is larger than the largest eigenvalue in Equation 7, the base station may better separate a signal subspace and a noise subspace. In addition, since either the SDP-based algorithm or the root-MUSIC algorithm is used, the method of estimating dr can be expanded to the case of a multi-path channel.

[Second Operation-Estimation of $\xi_u$ and $\varphi_u$]

Figure 6:
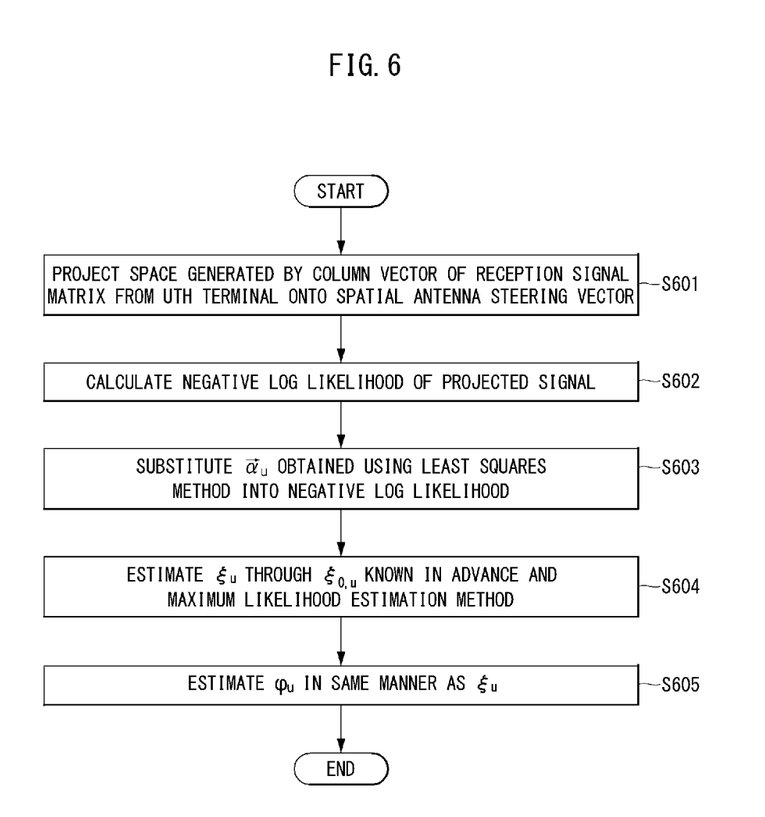
FIG. 6 is a flowchart illustrating the second operation of the method of estimating a channel.

FIG. 6 is a flowchart illustrating the second operation of the method of estimating a channel.

Referring to FIG. 6, in operation S402 of estimating $\xi_u$ in the second operation after the estimation in the first operation, the base station may project a space generated by the column vector of $Y_u$ onto a spatial antenna steering vector $u_M(\hat{\psi}_f)$ (S601). $\hat{\psi}_f$ may denote an estimated value of $\psi_f$. A projected signal may be calculated as in Equation 9 below.

$$Y_u^H u_M(\hat{\psi}_f) = \vec{y}_u = \quad \text{[Equation 9]}$$
$$[\vec{y}_{1,u}, \ldots, \vec{y}_{K,u}]^T = \sqrt{\rho}\, \underbrace{[1_K U_K(\xi_u)]}_{=:U_K(\vec{\xi}_u)} \underbrace{\begin{bmatrix} (U_M(\varphi_u)\beta_u)^H u_M(\hat{\psi}_f) \\ \alpha_u^* u_M^H(\psi_f)u_M(\hat{\psi}_f) \end{bmatrix}}_{=:\vec{\alpha}_u}$$

In Equation 9, the base station may express the projected signal as a function of $\vec{\alpha}_u$ and $\vec{\xi}_u:=[\xi_{0,u},\xi_u^T]^T$. Since $1_K$ corresponds to an antenna steering vector corresponding to an angle of departure of 0, $\xi_{0,u}$ may be expressed as $\xi_{0,u}=0$. Since the base station considers additive white noise in Equation 3, a negative log likelihood with respect to $(\vec{\xi}_u, \vec{\alpha}_u)$ may be calculated as in Equation 10 below (S602).

$$-\ln p(\vec{y}_u; \vec{\xi}_u, \vec{a}_u) \propto \left\| \vec{y}_u - U_K(\vec{\xi}_u)\vec{a}_u \right\|_2^2 \quad \text{[Equation 10]}$$

Since $\vec{\xi}_u$ and an unknown parameter $\vec{\alpha}_u$ are combined in Equation 10, it may be difficult for the base station to directly minimize the negative log likelihood. Therefore, in the present example embodiment, the base station may obtain an optimal $\vec{\alpha}_u$ and then may express the likelihood as a function of only $\vec{\xi}_u$. When $\vec{\xi}_u$ is fixed, the base station may obtain the optimal $\vec{\alpha}_u$ as $\vec{\alpha}_u = (1/\sqrt{\rho})U_K^\vee(\vec{\xi}_u)\vec{y}_u$ using a least-squares method. When $\vec{\alpha}_u$ is substituted into the negative log likelihood of Equation 10, the base station may express $$\Pi^\perp_{U_K(\vec{\xi}_u)} = I_K - U_K(\vec{\xi}_u)U_K(\vec{\xi}_u)^\dagger$$

as $$\min_{\vec{\xi}_u} \left\| \Pi^\perp_{U_K(\vec{\xi}_U)} \vec{y}_u \right\|_2^2$$

through a maximum likelihood estimation method (S603).

An orthogonal complement of a space generated by a column vector of $U_K(\vec{\xi}_u)$ may be the same as a null space of $(U_K(\vec{\xi}_u))^H$. When it is defined that a basis of $A \in \mathbb{C}$ hu $K \times (K-L_g-1)$ generates a null space with respect to $K \geq L_g+2$, a maximum likelihood estimation equation may be re-expressed as $\min_A \vec{y}_u^H (A^H A)^{-1} A^H \vec{y}_u$. In the present example embodiment, since the base station includes a linear array antenna structure, the matrix A may be expressed as a polynomial of $\mathcal{A}(z) = a_0 z^{L_g+1} + a_1 z^{L_g} + \ldots + a_{L_g+1}$ with respect to $z = e^{j\pi\xi_{l,u}}$, $l=0, \ldots, L_g$ and may be defined as in Equation 11 below.

$$A^H = \begin{bmatrix} a_{L_g+1} & \cdots & a_1 & 1 & 0 & \cdots & 0 \\ 0 & a_{L_g+1} & \cdots & a_1 & 1 & & \vdots \\ \vdots & & \ddots & & \ddots & \ddots & 0 \\ 0 & \cdots & 0 & a_{L_g+1} & \cdots & a_1 & 1 \end{bmatrix}$$ [Equation 11]

In Equation 11, the matrix A may satisfy a relationship of $([A]_{:,i})^H [U_K(\vec{\xi}_u)]_{:,l} = e^{j\pi\xi_{l,u}eu\,(i-1)}\mathcal{A}(e^{j\pi\xi_{l,u}}) = 0$ and thus may satisfy $A^H U_K(\vec{\xi}_u) = 0_{K-L_g-1} 0_{L_g+1}^T$. Therefore, the base station may estimate $A^H \vec{y}_u$ by finding a root of $\mathcal{A}(z)$. In addition, the base station may obtain a relationship of $A^H \vec{y}_u = \vec{Y}_u a$ using algebraic manipulation. $a = [a_{L_g+1}, \ldots, a_1, 1]^T$ may denote a vector in which coefficients of $\mathcal{A}(z)$ are accumulated, and $\vec{Y}_u$ may be calculated as in Equation 12 below.

$$\vec{Y}_u = \begin{bmatrix} \vec{y}_{1,u} & \cdots & \vec{y}_{L_g+2,u} \\ \vec{y}_{2,u} & \cdots & \vec{y}_{L_g+3,u} \\ \vdots & & \vdots \\ \vec{y}_{K-L_g-1,u} & \cdots & \vec{y}_{K,u} \end{bmatrix}$$ [Equation 12]

The base station may redefine the maximum likelihood estimation method as in $$\min_{a\, s.t.\, \|a\|_2=1} a^H \vec{Y}_u^H (A^H A)^{-1} \vec{Y}_u a,$$

but a cost function involving complex operations such as an inverse matrix operation cannot be solved analytically. Therefore, the base station can solve maximum likelihood estimation for $\vec{\xi}_u$ through an iterative method. When $a^{(i)}$ is given in an i-th iteration, the base station may calculate an inverse matrix of a Gram matrix such as $(A^{(i)H} A^{(i)})^{-1} \vec{Y}_u$. When $a^{(i+1)}$ may be calculated through a quadratic minimization problem as in Equation 13 below.

$$a^{(i+1)} = \underset{a\, s.t.\, \|a\|_2=1}{\operatorname{argmin}} a^H \vec{Y}_u^H (A^{(i)H} A^{(i)})^{-1} \vec{Y}_u a$$ [Equation 13]

In Equation 13, $a_{(i+1)}$ may be an eigenvector corresponding to the smallest eigenvalue of $\vec{Y}_u^H (A^{(i)H} A^{(i)})^{-1} \vec{Y}_u$. When $a^{(i+1)}$ converges through an iteration, the base station may estimate $\vec{\xi}_u = [\xi_{0,u}, \xi_u^T]^T$ through a root of a polynomial $\mathcal{A}(z)$ (S604). The above-described method may be different from an existing iterative maximum likelihood method in that $\xi_{0,u}$ is known in advance. When the root of the polynomial $\mathcal{A}(z)$ (that is, $\xi_{0,u}$) is known, since the number of parameters to be estimated may be reduced, and $\vec{Y}_u a$ may be substituted with $\check{Y}_u[a]_{2:L_g+2}$ of which an order is reduced, the base station may arrange an equation as in Equation 14 below.

$$\check{Y}_u = [\vec{Y}_u]_{:,2:L_g+2} - [\vec{Y}_u]_{:,1} e^{j\pi\xi_{0,u}} u_{L_g+1}^T (\xi_{0,u})$$ [Equation 14]

In Equation 14, a coefficient may be $a_{L_g+1} = -e^{j\pi\xi_{0,u}} u_{L_g+1}^T (\xi_{0,u})[a]_{2:L_g+2}$.

Since the base station may express Equation 13 as $$\min_{[a]_{2:L_g+2}\, s.t.\, \|[a]_{2:L_g+2}\|_2=1} ([a]_{2:L_g+2})^H \check{Y}_u^H (A^{(i)H} A^{(i)})^{-1} \check{Y}_u [a]_{2:L_g+2}$$

possible to reduce computational complexity.

In operation S403 of estimating $\varphi_u$ through a temporal characteristic of $Y_u$, the base station may project a subspace generated by the row vector of $Y_u$ onto an array response vector, in which all elements are 1, to express $Y_u 1_K$ as in Equation 15 below.

$$Y_u 1_K = \sqrt{\rho}\, [U_M(\varphi_u) u_M(\psi_f)] \begin{bmatrix} K\beta_u \\ \alpha_u^T U_K^H(\xi_u) 1_K \end{bmatrix}$$ [Equation 15]

Since Equation 15 and Equation 9 are very similar to each other, the base station may estimate $\varphi_u$ using the same iterative maximum likelihood estimation method as in the estimation of $\hat{\xi}_u$ (S605). The base station can reduce computational complexity by applying Equation 14 as in the case of estimating $\hat{\xi}_u$ and $\hat{\xi}_u$ using $\hat{\psi}_f$ estimated in the first operation of estimating a channel. $\hat{\xi}_u$ may denote an estimated value of $\xi_u$, and $\hat{\varphi}_u$ may denote an estimated value of $\varphi_u$.

[Path gain and estimation of $\alpha_u$ and $\beta_u$]

After the base station estimates all parameters related to angles on a path, in order to estimate a path gain, the base station may transform Equation 5 into Equation 16 below to formulate a linear estimation problem.

$$vec(Y_u) = \sqrt{\rho}\,\underbrace{[U_K^*(\xi_u) \otimes u_M(\hat{\psi}_f) 1_K \otimes U_M(\varphi_u)]}_{=\Theta(\hat{\psi}_f, \xi_u, \varphi_u) \in \mathbb{C}^{MK \times (L_g+L_h)}}\begin{bmatrix}\alpha_u \\ \beta_u\end{bmatrix} \quad \text{[Equation 16]}$$

In Equation 16, $vec(Y_u)$ may be in the form of a vector in which the column vector of $Y_u$ is accumulated. Therefore, the base station may linearly estimate path gains $\alpha_u$ and $\beta_u$ using $\iota(\psi_f, \xi_u, \varphi_u)$ which is estimated in advance.

[Expandability to Planar Array Antenna]

The above-described method of estimating a channel may be expanded from a linear array antenna to a planar array antenna by changing a reflection pattern of an IRS. A planar array antenna in which an IRS has $N_v$ rows and $N_h$ columns and includes a total of N reflectors may be taken into account. An azimuth angle and an elevation angle of an l-th path may be expressed as $\tilde{\xi}_{l,u}^{(h)} \in (0,\pi)$ and $\tilde{\xi}_{l,u}^{(v)} \in (0,\pi)$, respectively. An antenna steering vector of the IRS may be expressed in the form of a Kronecker product of two antenna steering vectors as in Equation 17 below.

$$u(\xi_{l,u}^{(h)}, \xi_{l,u}^{(v)}) = u_{N_h}(\xi_{l,u}^{(h)}) \otimes u_{N_v}(\xi_{l,u}^{(v)}) \quad \text{[Equation 17]}$$

In Equation 17, parameters related to an angle may be defined as $\xi_{l,u}^{(h)} := \cos(\tilde{\xi}_{l,u}^{(h)})\sin(\tilde{\xi}_{l,u}^{(v)})$ and $\xi_{l,u}^{(v)} := \cos(\tilde{\xi}_{l,u}^{(v)})$. Therefore, Equation 9 may be expressed again as follows.

$$\vec{y}_u = \quad \text{[Equation 18]}$$
$$Y_u^H u_M(\hat{\psi}_f) = \sqrt{\rho}\,[1_K \; W^H U(\xi_u^{(h)}, \xi_u^{(v)})]\begin{bmatrix}h_u^H u_M(\hat{\psi}_f) \\ \alpha_u^* u_M^H(\psi_f)u_M(\hat{\psi}_f)\end{bmatrix}$$

An antenna steering matrix may be defined as in Equation 19 below.

$$U(\xi_u^{(h)}, \xi_u^{(v)}) = [u(\xi_{1,u}^{(h)}, \xi_{1,u}^{(v)}), \ldots, u(\xi_{L_g,u}^{(h)}, \xi_{L_g,u}^{(v)})] \quad \text{[Equation 19]}$$

In order to apply the above-described method of estimating a channel to the planar array antenna, the base station may divide an on-off reflection pattern of the IRS into vertical and horizontal elements. Accordingly, the on-off reflection patterns used in vertical and horizontal directions may be calculated according to Equation 20 below.

$$W^{(v)} = e_{N_h}(n_h) \otimes I_{N_v} \in \mathbb{R}^{N \times N_v} \quad \text{[Equation 20]}$$
$$W^{(h)} = I_{N_h} \otimes e_{N_v}(n_v) \in \mathbb{R}^{N \times N_h}$$

$e_P(p)$ may denote a p-th column vector of $I_P$, $W^{(v)}$ may mean that an $n_h$-th column element is changed to an on state, and $W^{(h)}$ may mean that a $n_v$-th row element is changed to an on state. From Equations 17 and 20, a signal vector reflected by the IRS may be expressed as Equation 21 below.

$$(W^{(v)})^T u(\xi_{\ell,u}^{(h)}, \xi_{\ell,u}^{(v)}) = e^{j\pi \xi_{\ell,u}^{(h)}(n_h-1)} u_{N_v}(\xi_{\ell,u}^{(v)}) \quad \text{[Equation 21]}$$
$$(W^{(h)})^T u(\xi_{\ell,u}^{(h)}, \xi_{\ell,u}^{(v)}) = e^{j\pi \xi_{\ell,u}^{(v)}(n_v-1)} u_{N_h}(\xi_{\ell,u}^{(h)})$$

In order to improve channel estimation performance, the base station may introduce new variables $K_v$ and $K_h$ indicating the number of reflection iterations in the vertical and horizontal directions. A reflection pattern repeated during a training period may be expressed as in Equation 22 below.

$$W = [1_{K_v}^T \otimes W^{(v)} \; 1_{K_h}^T \otimes W^{(h)}] \quad \text{[Equation 22]}$$

According to Equation 22, training overhead may be $K = K_v N_v + K_h N_h$. A pilot signal reflected by $W^{(v)}$ may be expressed as in Equation 23 below.

$$\vec{y}^{(v)} = \sum_{i=1}^{K_v} [\vec{y}_u]_{(i-1)N_v+1:iN_v} \quad \text{[Equation 23]}$$
$$= K_v\sqrt{\rho}\,[1_K \; U_{K_v}(\xi_u^{(v)})]\begin{bmatrix}h_u^H u_M(\hat{\psi}_f) \\ D_{n_h}^{(h)} \alpha_u^* u_M^H(\psi_f)u_M(\hat{\psi}_f)\end{bmatrix}$$

In Equation 23, it may be defined that $$D_{n_h}^{(h)} = \text{diag}\left(e^{j\pi \xi_{1,u}^{(h)}(n_h-1)}, \ldots, e^{j\pi \xi_{L_g,u}^{(h)}(n_h-1)}\right).$$

A pilot signal reflected by W (h) may be expressed as in Equation 24 below.

$$\vec{y}^{(h)} = \sum_{i=1}^{K_h} [\vec{y}_u]_{(i-1)N_h+1+K_vN_v:iN_h+K_vN_v} \quad \text{[Equation 24]}$$
$$= K_h\sqrt{\rho}\,[1_K \; U_{K_h}(\xi_u^{(h)})]\begin{bmatrix}h_u^H u_M(\hat{\psi}_f) \\ D_{n_v}^{(v)} \alpha_u^* u_M^H(\psi_f)u_M(\hat{\psi}_f)\end{bmatrix}$$

In Equation 24, it may be defined that $$D_{n_v}^{(v)} = \text{diag}\left(e^{j\pi \xi_{1,u}^{(v)}(n_v-1)}, \ldots, e^{j\pi \xi_{L_g,u}^{(v)}(n_v-1)}\right).$$

Received signals of Equations 23 and 24 may have the same form as that of Equation 9 which is a received signal in the linear array antenna. Therefore, the base station may individually apply an algorithm applied to the linear array antenna to an azimuth angle and an elevation angle.

By using the fact that both $W^{(v)}$ and $W^{(h)}$ in Equation 20 use $n_v$-th and $n_h$-th reflection elements, the base station can further reduce training overhead in addition to a reflection element shared at a time max $\{K_v, K_h\}$ in W of Equation 22.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner. The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of estimating a channel of a base station in a communication system using an intelligent reflecting surface, the method comprising:
  receiving a first signal through a direct path between a terminal and the base station from the terminal and a second signal through an indirect path through the intelligent reflecting surface from the terminal;
  estimating a first angle of arrival of the second signal received from the intelligent reflecting surface;
  estimating a second angle of arrival of a signal transmitted to the intelligent reflecting surface by the terminal based on the estimated first angle of arrival;
  estimating a third angle of arrival of the first signal received from the terminal based on the estimated first angle of arrival; and
  estimating path gains on the direct path and the indirect path based on the estimated first angle of arrival to the estimated third angle of arrival.

2. The method of claim 1, wherein the receiving of the first signal through the direct path between the terminal and the base station from the terminal and the second signal through the indirect path through the intelligent reflecting surface from the terminal further includes, when a third signal in which the first signal and the second signal are added is received from the terminal, separating the first signal and the second signal from the third signal.

3. The method of claim 1, wherein:
  the first angle of arrival is estimated based on a first algorithm; and
  the first algorithm includes at least one of a root-multiple signal classification (root-MUSIC) algorithm and a semi-definite programming algorithm.

4. The method of claim 1, wherein the second angle of arrival is estimated by iteratively applying an array response vector in which all elements are 1 and a maximum likelihood estimation method in a time domain.

5. The method of claim 1, wherein the third angle of arrival is estimated by iteratively applying a maximum likelihood estimation method.

6. The method of claim 1, wherein the path gain on the direct path and the path gain on the indirect path are estimated based on a linear estimation method using the estimated first angle of arrival to the estimated third angle of arrival.

7. The method of claim 1, wherein an on-off reflection pattern of the intelligent reflecting surface is varied according to a type of an antenna array included in the base station.

8. The method of claim 7, wherein the on-off reflection pattern is determined based on the number of reflection repetitions.

9. The method of claim 8, wherein, when the base station includes a planar array antenna, the on-off reflection pattern includes a reflection element shared when the number of reflection repetitions in a horizontal direction and the number of reflection repetitions in a vertical direction are each maximum.

10. The method of claim 1, wherein:
  the intelligent reflecting surface includes a plurality of dynamically adjustable reflectors; and
  a communication channel between the intelligent reflecting surface and the base station is a channel in which one line-of-sight propagation path is present.

11. A base station in a communication system using an intelligent reflecting surface, the base station comprising:
  a processor;
  a memory configured to electronically communicate with the processor; and
  instructions stored in the memory,
  wherein, when the instructions are executed by the processor, the instructions operate to cause the base station to:
  receive a first signal through a direct path between a terminal and the base station from the terminal and a second signal through an indirect path through the intelligent reflecting surface from the terminal;
  estimate a first angle of arrival of the second signal received from the intelligent reflecting surface;
  estimate a second angle of arrival of a signal transmitted to the intelligent reflecting surface by the terminal based on the estimated first angle of arrival;
  estimate a third angle of arrival of the first signal received from the terminal based on the estimated first angle of arrival; and
  estimate path gains on the direct path and the indirect path based on the estimated first angle of arrival to the estimated third angle of arrival.

12. The base station of claim 11, wherein, when the first signal through the direct path between the terminal and the base station and the second signal through the indirect path through the intelligent reflecting surface are received from the terminal, the instructions operate to cause the base station to, when a third signal in which the first signal and the second signal are added is received from the terminal, separate the first signal and the third signal from the third signal.

13. The base station of claim 11, wherein:
the instructions operate to cause the base station to estimate the first angle of arrival based on a first algorithm; and
the first algorithm includes at least one of a root-multiple signal classification algorithm and a semi-definite programming algorithm.

14. The base station of claim 11, wherein the instructions operate to cause the base station to estimate the second angle of arrival by iteratively applying an array response vector in which all elements are 1 and a maximum likelihood estimation method in a time domain.

15. The base station of claim 11, wherein the instructions operate to cause the base station to estimate the third angle of arrival by iteratively applying a maximum likelihood estimation method.

16. The base station of claim 11, wherein the instructions operate to cause the base station to estimate the path gain on the direct path and the path gain on the indirect path based on a linear estimation method using the estimated first angle of arrival to the estimated third angle of arrival.

17. The base station of claim 11, wherein the instructions operate to cause the base station to vary an on-off reflection pattern of the intelligent reflecting surface according to a type of an antenna array included in the base station.

18. The base station of claim 17, wherein the instructions operate to cause the base station to determine the on-off reflection pattern based on the number of reflection repetitions.

19. The base station of claim 18, wherein, when the base station includes a planar array antenna, the instructions operate to cause the on-off reflection pattern to include a reflection element shared when the number of reflection repetitions in a horizontal direction and the number of reflection repetitions in a vertical direction are each maximum.

* * * * *